United States Patent [19]

Pollard et al.

[11] Patent Number: 4,782,201

[45] Date of Patent: Nov. 1, 1988

[54] SWITCH ACTUATING ASSEMBLY

[75] Inventors: Lorne R. Pollard, Naperville, Ill.; Ronald Stowell, Oakville; William Flood, Burlington; Eugen J. Bexten, Ancaster; J. Richard Harwood, Innerkip, all of Canada

[73] Assignee: J. I. Case Company, Racine, Wis.

[21] Appl. No.: 67,219

[22] Filed: Jun. 29, 1987

[51] Int. Cl.$^4$ ............................................. H01H 3/16
[52] U.S. Cl. .................... 200/61.44; 172/413
[58] Field of Search .............. 200/61.44, 61.41, 61.42, 200/61.43; 172/413

[56] References Cited

U.S. PATENT DOCUMENTS 4,026,365 5/1977 Andersson et al. ................. 172/413
4,488,071 12/1984 Lane ................................. 200/61.62

Primary Examiner—A. D. Pellinen
Assistant Examiner—Morris Ginsburg
Attorney, Agent, or Firm—Dressler, Goldsmith, Shore, Sutker & Milnamow, Ltd.

[57] ABSTRACT

A switch actuation assembly is provided with a support means for supporting the switch in a fixed position relative to orientations of a moveable member. A motion response element is operably connected to the moveable member for being moved in one of two directions in response to movement of the moveable member toward one of the orientations and for being moved in the other of the two directions in response to the movement of the moveable member toward the other of the two orientations. An actuating member is provided for engaging the switch to actuate the switch from a first position to a second position. The actuating member is in frictional contact with the motion response element whereby the actuating member is moved by the response element until any force of resistance to the movement of the actuating member exceeds the static friction force.

9 Claims, 4 Drawing Sheets

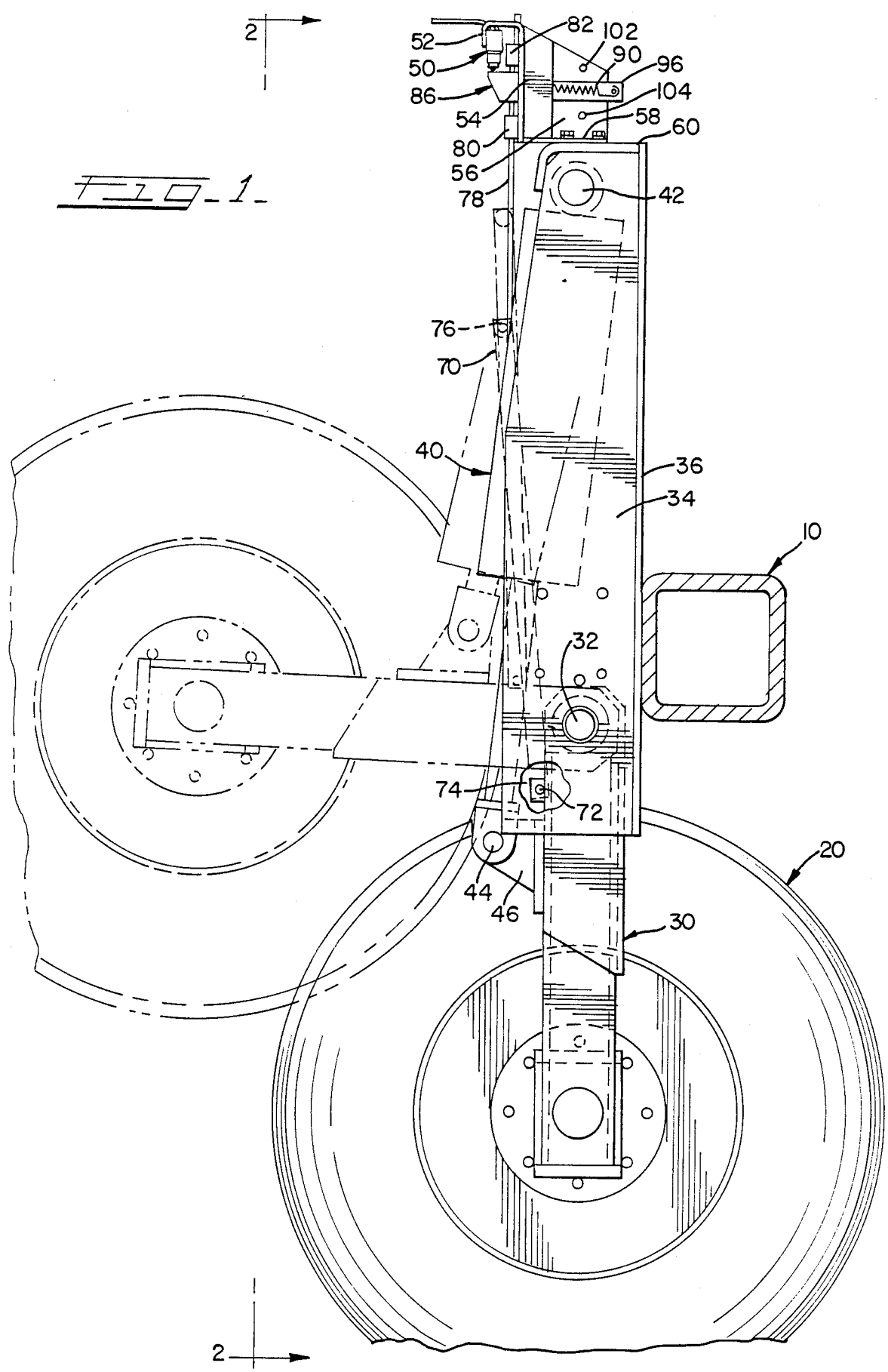

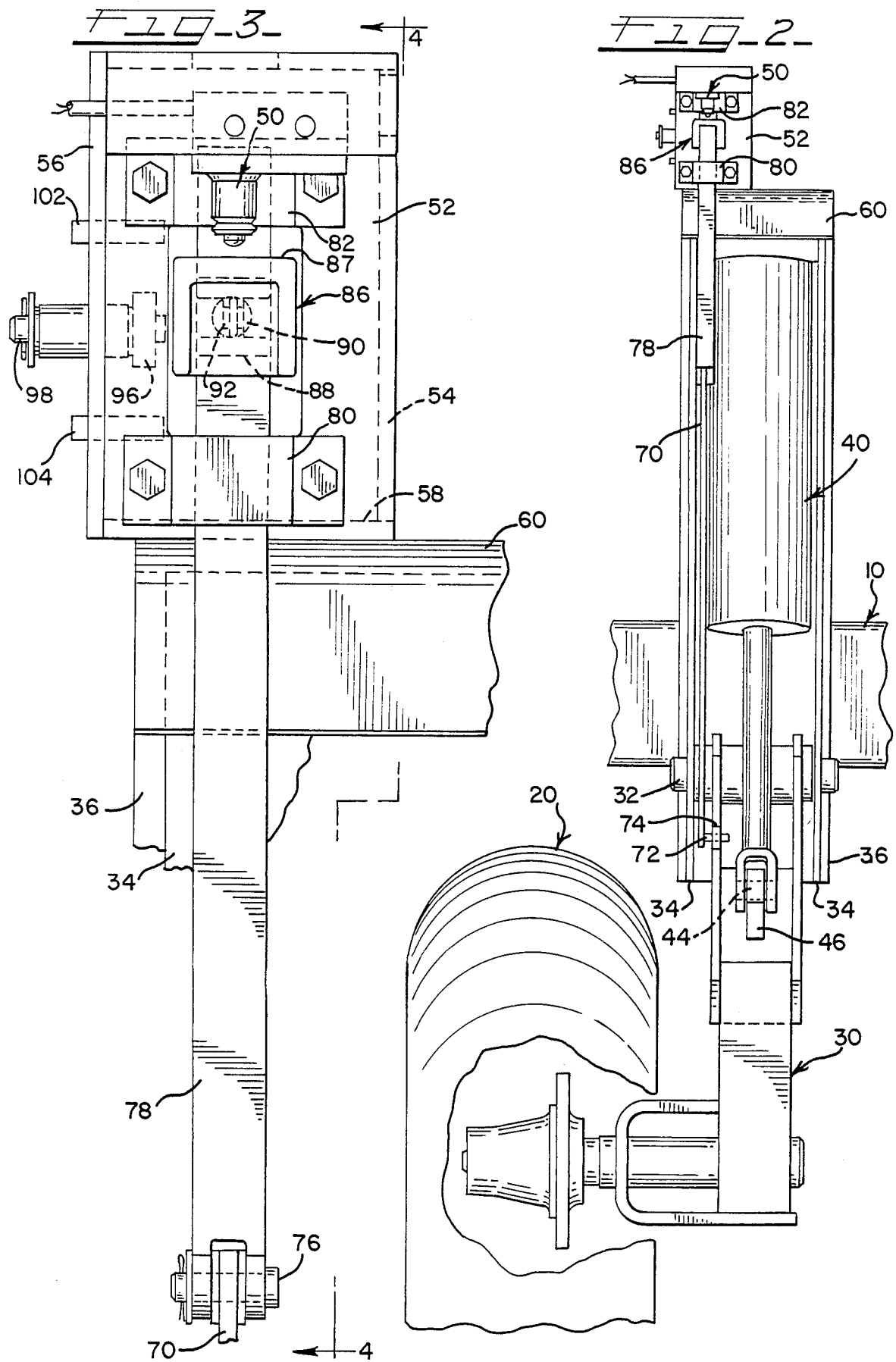

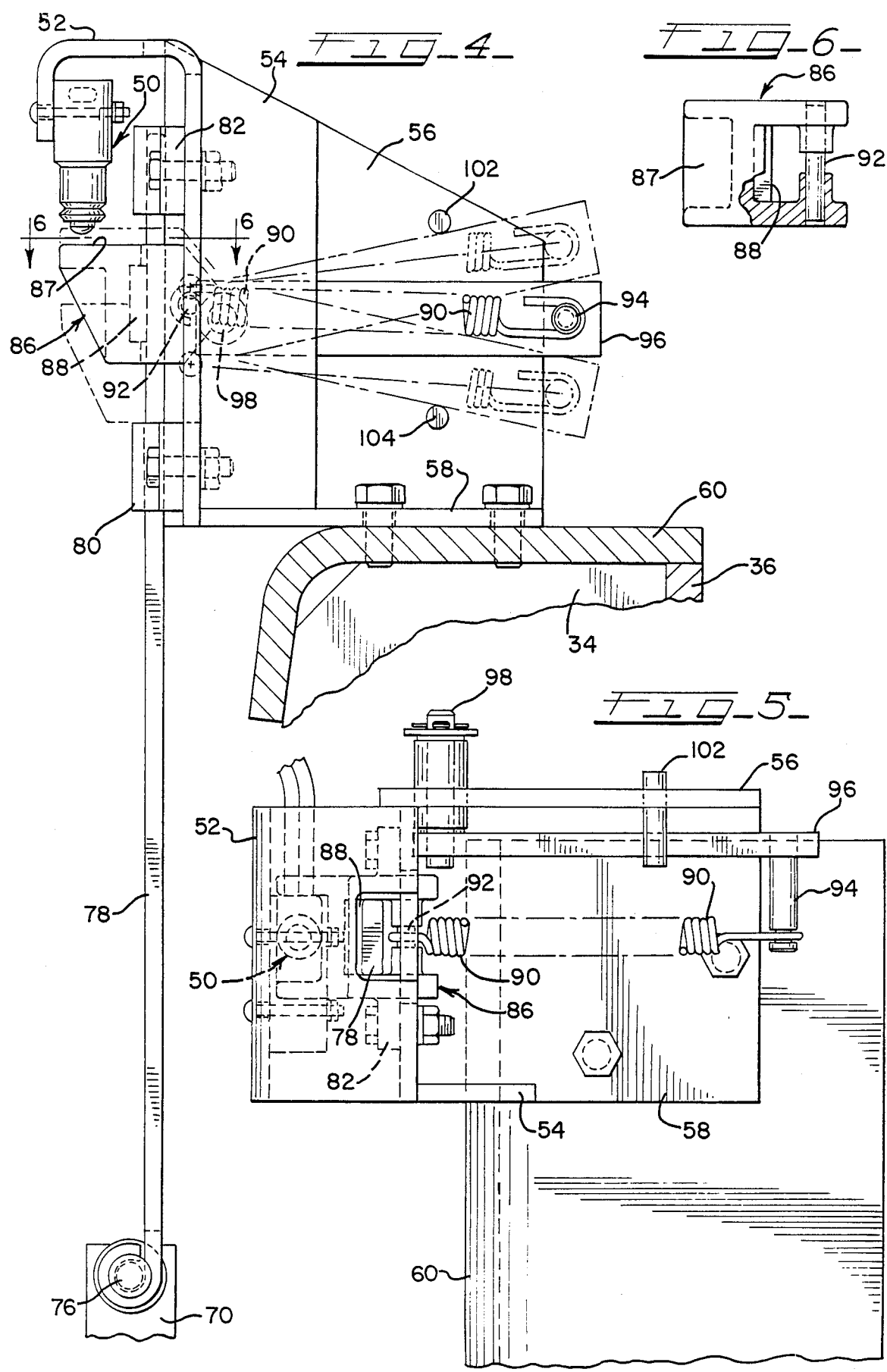

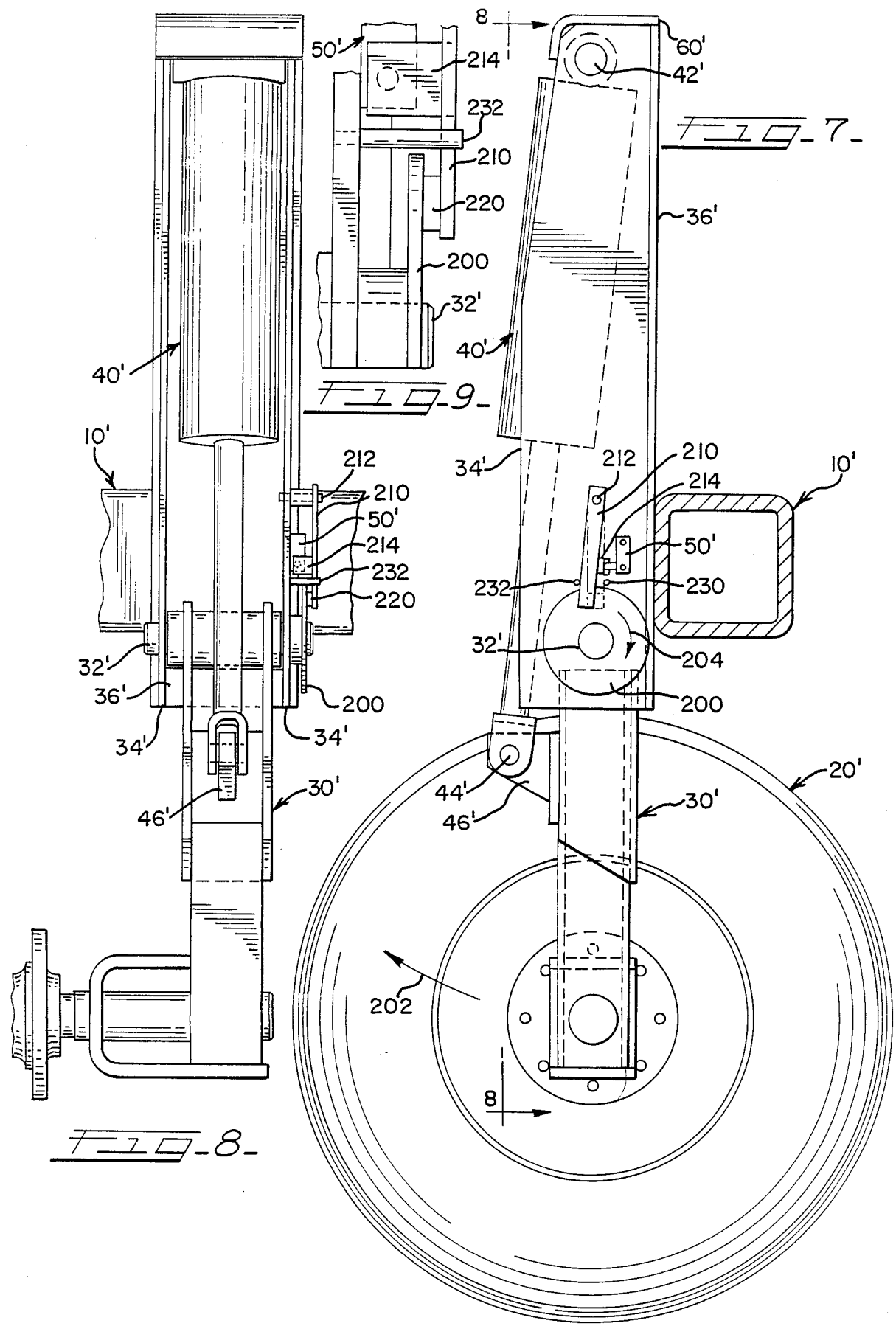

SWITCH ACTUATING ASSEMBLY

TECHNICAL FIELD

This invention relates to apparatus for use with machines having a switch activated by the position of a moveable member. This invention is especially useful for mobile agricultural machines which have working tools moveable between a lowered, working position and an elevated, transport position and which have drive apparatus for related seeding or planting mechanisms that are engaged when the working tools are in the working position and that are disengaged when the working tools are in the transport position.

BACKGROUND OF THE INVENTION AND TECHNICAL PROBLEMS POSED BY THE PRIOR ART

In various machines, especially mobile agricultural machines, it may be desired to actuate certain drive apparatus in response to the position of a moveable member. For example, on agricultural machines such as drills, planters, etc., the machine earth working tools are carried by a frame which is typically moved between a lowered, working position and an elevated, transport position. The drive apparatus for operating the related seeding or planting mechanisms is typically engaged when the working tool frame is in the working position and is disengaged when the working tool is in the elevated transport position.

Typically, an electric magnetic clutch is used for operating the drive apparatus for the seeding or planting mechanisms, and the electric magnetic clutch is actuated by means of an electric switch in response to the position of the working tool frame relative to the position of the working tool frame wheels.

Conventionally, actuation of the seeding or planting mechanism drive apparatus occurs at one end-point position of the working tool frame relative to the wheels. That is, when the working tool frame has been moved to the fully lowered, ground-engaging position, the drive apparatus for the seeding or planting mechanism is actuated. Conversely, the drive apparatus for the seeding or planting mechanism is switched off when the working tool frame has been fully elevated to the road transport position.

The above-described conventional practice has certain disadvantages. For example, it may sometimes be desirable to initiate the drive apparatus for the seeding or planting mechanisms as the working tools are lowered, rather than waiting until the working tools reach the fully lowered, ground-engaging position.

Further, in some instances with conventional machines, the working tools, for one reason or another, may not be elevated to the fully raised, road transport position. Thus, the switch for turning off the the seeding or planting mechanism drive apparatus may not be automatically actuated. Accordingly, it would be desirable to provide means for actuating the switch to turn off the drive apparatus as the working tools begin to be elevated away from the ground-engaging position rather than waiting for the working tools to be raised to the fully elevated position.

It would also be desirable to provide a switch actuating assembly which could be located high enough above the ground so that it does not get fouled with debris. Also, it would be beneficial if such a switch actuating mechanism was substantially resistant to normal vibrations when the machine is being operated with the working tools in the lowered, ground-engaging position or with the working tools elevated in the road transport position. Finally, it would be desirable to provide an imroved actuating assembly which would prevent impact damage to the switch in response to movement of the actuating assembly components to or beyond the switch actuation point.

SUMMARY OF THE INVENTION

An actuator assembly is provided for use in a machine having a movable member that is movable between two orientations. The actuating assembly is adapted to actuate an electric switch from a first position to a second position upon movement of the member from one of the two orientations and for at least accommodating actuation of the switch back to the second position upon movement of the member from the other of the two orientations. The assembly includes a support means for supporting the switch in a fixed position relative to the moveable member orientations. The assembly includes a motion response element operably connected to the moveable member for being moved in one of two directions in response to movement of the moveable member toward one of the orientations and for being moved in the other of the two directions in response to movement of the moveable member toward the other of the orientations. An actuating member is provided with an engaging surface for engaging the switch to actuate the switch to the second position. The actuating member is in frictional contact with the motion response element whereby the actuating member is moved by the response element until any force of resistance to the movement of the actuating member exceeds the static friction force.

Numerous other advantages and features of the present invention will become readily apparent from the foregoing detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 is a fragmentary, partial cross-sectional, elevational view of the working tool frame and associated transport wheels of an agricultural machine incorporating the switch actuating assembly of the present invention, it being realized that elevated, road transport position of the working tool is illustrated in solid line and the lowered, ground-engaging position is illustrated in dashed line;

FIG. 2 is a fragmentary, rear elevational view taken along the plane 2—2 in FIG. 1 with the working tool frame shown in the elevated, road transport position and with a transport wheel shown partially broken away to illustrate interior detail;

FIG. 3 is a greatly enlarged, fragmentary view of the upper portion of the actuating assembly shown in FIG. 2;

FIG. 4 is a fragmentary, cross-sectional view taken generally along the plane 4—4 in FIG. 3;

FIG. 5 is a fragmentary, top plan view of the assembly illustrated in FIG. 4;

FIG. 6 is a top plan view of the actuating member block taken generally along the plane 6—6 in FIG. 4 with a portion of the block broken away to better illustrate interior detail and with the other components omitted for clarity;

FIG. 7 is a fragmentary, cross-sectional view similar to FIG. 1 but showing an alternate embodiment of the switch actuating assembly;

FIG. 8 is a fragmentary, front elevational view taken generally the plane 8—8 in FIG. 7 with the wheel omitted for ease of illustration; and FIG. 9 is a greatly enlarged, fragmentary view of a portion of the assembly shown in FIG. 8.

DESCRIPTION OF THE PREFERRED EMBODIMENTS

While this invention is susceptible of embodiment in many different forms, the specification and the accompanying drawings disclose only some specific forms as examples of the use of the invention. The invention is not intended to be limited to the embodiments so described, and the scope of the invention will be pointed out in the appended claims.

The apparatus of this invention is used with conventional components, the details of which, although not fully illustrated or described, will be apparent to those having skill in the art and an understanding of the necessary functions of such components.

A first embodiment of the switch actuating assembly of the present invention is illustrated in FIGS. 1-6. As illustrated in FIG. 1, the assembly may be provided on a machine, such as a mobile agricultural machine having a working tool frame 10. Working tools (not illustrated) are typically supported, directly or indirectly, from the frame 10.

The frame 10, and hence the working tools supported thereon, may be raised or lowered relative to the ground. To this end, working tool frame transport wheels 20 are provided for being moved (by means described in more detail hereinafter) relative to the frame 10 between a first orientation illustrated in solid line and a second orientation illustrated in dashed line. Although only one wheel 20 is illustrated, it is to be understood that the working tool frame 10 may have considerable width (normal to the plane of FIG. 1) and may be supported by a plurality of such wheels 20 at spaced locations along the frame 10.

When the wheels 20 are in the orientation illustrated in solid line in FIG. 1, the working tool frame 10, and hence the working tools carried thereon, are spaced away from the ground and are in the elevated, road transport orientation. When the wheels 20 are in the orientation illustrated by dashed line in FIG. 1, the working tool frame 10, and hence the working tools carried thereon, are in the lowered orientation, and the working tools carried on the frame 10 are in the ground-engaging position.

Each wheel 20 is mounted to a moveable wheel frame member 30 which is mounted to a shaft 32. The shaft 32 is journaled for rotation within a housing that extends above each wheel frame member 30 and that is defined by two spaced-apart parallel plates 34 which are mounted to a back plate 36 carried by the working tool frame 10.

A suitable actuator, such as a double-acting hydraulic piston-cylinder actuator 40, is associated with at least one of the wheels 20. The actuator 40 is pivotally mounted at its upper end between the housing plates 34 about a pin 42 as best illustrated in FIG. 1. The lower end of the actuator 40 is pivotally connected about a pin 44 to a bracket 46. secured to the wheel frame member 30.

Operation of the actuator 40 to retract the piston moves the wheel frame member 30 to the orientation illustrated in dashed line in FIG. 1 wherein the working tool frame 10 is in the lowered, ground-engaging position. Conversely, operation of the actuator 40 to extend the piston moves the wheel frame member 30 to the orientation illustrated in solid line in FIG. 1 wherein the working tool frame 10 is in the elevated, road-transport position.

In some applications it is desirable to switch on drive apparatus (not illustrated) for associated seeding or planting mechanisms (not illustrated) when the working tool frame 10 begins to be lowered toward the ground-engaging position. It may also be desirable to switch off such drive apparatus when the working tool frame 10 begins to be raised toward the elevated, road transport position (with the wheels 20 in solid line in FIG. 1). To this end, a switch 50 is provided (shown in FIG. 1 in solid line in a deactuated condition). The switch 50 would typically be provided in the circuit of an electric magnetic clutch (not illustrated) which controls the actuation of the drive apparatus associated with the seeding or planting mechanisms.

The switch 50 is mounted to a bracket 52 carried by vertical support plates 54 and 56 and by a horizontal support plate 58. The plate 58 is mounted to an end plate 60 at the top of the cylinder actuator housing plates 34 and 36. The bracket 52, along with the plates 34, 36, 54, 56, 58, and 60, can be regarded as a support means for supporting the switch 50 in a fixed location or position relative to the two orientations of the wheel frame member 30.

The switch 50 is preferably located some distance above the wheel 20 as illustrated in FIG. 1 so as to reduce the likelihood of the switch 50 being covered and/or clogged with dirst and debris. The switch 50 may be of the two position plunger type construction with an internal spring for biasing the switch into a self-maintained first position.

A novel assembly is provided for actuating the switch 50. A link 70, is pivotally connected at its lower end by means of a pin 72 to a lug 74 mounted to the wheel frame member 30. At its upper end, the link 70 is pivotally connected by means of a pin 76 to a bar 78. The bar 78 is constrained to vertical motion at its upper end adjacent the switch support bracket 52 by two spaced-apart guide members, lower guide member 80 and upper guide member 82. The guide members 80 and 82 are each mounted to the bracket 52 and accommodate vertical reciprocal motion of the bar 78 between the switch 50 and an adjacent vertical portion of the switch mounting bracket 52.

When the actuator 40 is retracted to move the working tool frame wheel member 30 to the orientation illustrated in dashed line in FIG. 1, the link 70 and bar 78 are moved upwardly toward the switch 50. Conversely, when the actuator 40 is extended to move the working tool frame wheel member 30 to the orientation illustrated in solid line in FIG. 1, the link 70 and bar 78 are moved downwardly in the direction away from the switch 50. Thus, the link 70 and bar 78 can together be regarded as functioning as a motion response element which is responsive to the movement of the moveable wheel frame member 30.

An actuating member in the form of a block 86 is provided adjacent the bar 78 between the lower bracket 80 and the upper bracket 82. The top of the block 86 defines an engaging surface 87 (as best illustrated in FIG. 4) for engaging the switch 50 to actuate the switch 50 from the first position to a second position.

As best illustrated in FIG. 6, the block 86 also carries an insert pad 88 adapted to be held in surface-to-surface contact with the bar 78 (the bar 78 being omitted from FIG. 6 for ease of illustration). The pad 88 is preferably biased into frictional engagement with the bar 78 by means of a tension spring 90 (FIGS. 4 and 5). One end of the spring 90 is connected to the actuating member block 86 about a pin 92, (shown without the spring in FIG. 6). At the opposite end, the spring 90 is attached to a pin 94 mounted to the free end of a lever 96. The lever 96 is pivotally mounted on the other end about a pin 98 to the switch support housing plate 56.

An upper stop pin 102 is mounted in the switch support housing plate 56 for engaging the upper surface of the lever 96 (as illustrated in dashed line FIG. 4), and a lower stop pin 104 is provided in the switch housing plate 56 for engaging the lower surface of the lever 96 (as illustrated in dashed line in FIG. 4).

The spring 90 functions to apply a force acting through the pad 88 against the bar 78. By appropriate selection of the tension spring force and of the static friction characteristics of the bar 78 and pad 88, a sufficient static friction force can be obtained such that the switch actuating block 86 will move upwardly or downwardly with the bar 78 until any force of resistance to the movement of the block 86 exceeds the static friction force. Such resistance to the movement of the block 86 would be encountered when the block 86 engages the switch 50 as the bar 78 moves upwardly. If the bar 78 continues to move upwardly, the block 86, being restrained by the switch 50, will slip relative to the upwardly moving bar 78. The spring 90, bar 78, and pad 88 are selected so that the block 86 will slip, upon hitting the switch 50 at a limiting magnitude of static friction force that is sufficiently low to prevent damage to the switch 50 and/or switch support components.

As the block 86 moves toward the highest elevation indicated by dashed lines in FIG. 4 to actuate the switch 50, the free end of the lever 96 necessarily pivots upwardly. Stop pin 102 is provided at a predetermined elevation to limit the upward movemen of the lever 96. The limit of the upward movement, in conjunction with the tension characteristics of the spring 90, accommodates the slipping of the block 86 in the uppermost position against the switch 50 at a force sufficiently low to prevent damage to the switch 50 and/or the supporting components.

Actuation of the switch 50 would typically energize an electric magnetic clutch (not illustrated) for operating the drive apparatus of related seeding or planting mechanisms (not illustrated). Thus, the seeding or planting would begin as the working tool frame 10 begins moving downwardly toward the full ground-engaging position. Even though the switch 50 is engaged by the block 86 prior to the full ground-engaging position being reached, the slippage of the block 86 relative to the bar 78 permits the bar 78 to continue moving upwardly alongside the switch 50 until the working tools reach the full ground-engaging position.

When it is desired to raise the working tool frame 10 to the elevated, road transport position, it may also be desirable to terminate the seeding or planting operation as the working tool frame 10 begins to be moved away from the ground-engaging position. It may be especially desired that the seeding or planting process be terminated prior to the working tool frame 10 being raised to the fully elevated, road transport position. This would ensure that, even if the working tool frame 10 does not, for some reason, reach the fully elevated, road transport position, at least the seeding and planting drive apparatus will be switched off.

To this end, a relatively small movement of the wheel frame 30 that only partially raises the working tool frame 10 will still effect release of the switch 50 so as to deenergize the seeding or planting drive apparatus. Specifically, as the actuator 40 is extended to move the wheel frame member 30 (away from the orientation illustrated in dashed line of FIG. 1), the bar 78 is moved downwardly. Owing to the frictional engagement between the switch actuation block 86 and the bar 78, the block 86 moves downwardly with the bar 78. Since there is no initial resistance to the downward movement of the block 86, the block 86 moves with the bar 78 and does not slip relative thereto. As the block 86 moves downwardly, the self-biased switch 50 moves back to its first position and deenergizes the drive apparatus for the seeding or planting mechanisms.

As the working tool frame 10 continues to move to the fully elevated, road-transport position, the bar 78 is pulled downwardly further, and the block 86 continues to be carried downwardly further with the bar 78. During this downward movement, the free end of the lever 96 pivots downwardly (as illustrated in dashed line in FIG. 4), and contacts the stop pin 104. The static friction force between the pad 88 and the bar 78 is eventually overcome by the spring force so that the block 86 slips in a lowered position while the bar 78 continues to move downwardly until the working tool frame 10 has reached the fully elevated, road-transport position.

As illustrated in FIG. 4, the lower bracket 80 may also function as a stop means for limiting the downward movement of the block 86. However, if the lower bracket 80 were eliminated altogether, the downward movement of the block 86 would eventually terminate when the upward force generated by the spring 90 exceeds the static friction force between the block pad 88 and the bar 78.

An alternate embodiment of the invention is illustrated in FIGS. 7-9. The elements of the alternate embodiment that are identical or functionally analagous to those of the first embodiment described above with reference to FIGS. 1-6 are designated by reference numerals identical to those used for the first embodiment with the exception that the alternate embodiment reference numerals are followed by a prime mark.

In the alternate embodiment, the working tool frame 10' is moved between the elevated, road-transport position and the lowered, ground-engaging position by moving the wheel 20' and wheel frame 30' with an actuator 40' in a manner identical to the operation of the first embodiment described above. As in the first embodiment, the alternate embodiment wheel frame 30' is fixed to a pin 32' which is journaled in plates 34' mounted on back plate 46'; a pin 42' pivotally mounts actuator 40' to plates 34', and a pin 44' pivotally connects actuator 40' to a bracket 46' secured to wheel frame member 30'. However, the vertically reciprocable motion response element mechanism employed in the first embodiment is eliminated in the alternate embodiment illustrated in FIGS. 7-9. Instead, the alternate embodiment is provided with a disc 200 which is mounted to the shaft 32' for rotation therewith. Thus, whenever the wheel frame member 30' is pivoted in the direction of the arrow 202 as illustrated in FIG. 7, the disc 200 rotates in a first direction as indicated by the arrow 204. Conversely, when the wheel frame member 30' is pivoted back to the orientation illustrated in FIG. 7, the disc 200 rotates in the direction opposite to that indicated by arrow 204.

A switch 50' is mounted to the actuator housing side plate 34' adjacent the disc 200. A bar 210 is provided for actuating the switch 50', and the bar 210 is pivotally mounted about a pivot axis 212 fixed relative to the switch 50'. The bar 210 has a free end pivotable about the bar pivot axis 212 in a plane parallel to the plane of rotation of the disc 200. The bar 210 includes a lug 214 for actuating the switch 50' and carries a pad 220 in surface-to-surface contact with the disc 200. The bar 210 is preferably fabricated from a spring material and is mounted about the bar pivot axis 212, so as to function as a biasing means whereby the pad 220 is urged against the disc 200.

When the working tool frame 10' is lowered toward the ground-engaging position, the wheel frame 30' pivots relative to the switch 50' (in the direction of arrow 202 in FIG. 7). The disc 200 necessarily rotates (clockwise in the direction of arrow 204 as illustrated in FIG. 7). This carries the free end of the bar 210 (toward the right as viewed in FIGS. 7) against the switch 50'. This actuates the switch 50' to energize the drive apparatus for the associated seeding or planting mechanisms. To prevent overtravel of the bar 210 and damage to the switch 50', a stop pin 230 is mounted to the actuator housing side plate 34' between the bar 210 and the switch 50'.

The switch 50' is permitted to return to the first position as the working tool frame 10' is raised to the elevated, road transport position. This is accommodated by the rotation of the disc 200 (counterclockwise in FIG. 7) which carries the bar 210 away from the switch 50'. In order to limit movement of the bar 210 in the direction away from the switch 50', another pin 232 is mounted to the actuator housing side plate 34' on the other side of the bar 210.

Although the invention has been described for use in conjunction with a switch that is internally or self-biased to a normal, first position, it is to be realized that the invention may be adapted for use with other kinds of switches. For example, the invention may be used for actuation of a two-position, single throw toggle switch. To this end, the actuating member (86 or 210) could be provided with a suitable second engaging surface or engaging structure. One engaging surface of the actuating member would engage and actuate the switch from a first to a second position, and the second engaging surface of the actuating member would engage and actuate the switch back to the first position.

With either embodiment of the invention as described above, it is seen that overtravel of the switch actuating member (86 or 210) can be limited (as with mechanical stops or spring tension) to prevent damage to the switch and to limit travel of some of the components. However, the novel frictional engagement between the switch actuating assembly components permits overtravel of some of the other components after the switch has been actuated. The switch can thus be advantageously actuated near the beginning of a movement cycle.

With the novel switch actuation assembly of the present invention, some magnitude of component travel can be designed into the system for actuation of the switch to at least one of the two switch positions. By requiring a sufficient amount of component travel, ordinary vibration of the switch actuation assembly components will not cause accidental actuation of the switch to that one position.

Finally, it is seen that the switch actuation assembly can be provided on agricultural or earth-working machines such that the switch can be located on an area of the machine that is not unusually susceptible to being clogged up with dirt and debris.

It will be readily observed from the foregoing detailed description of the invention and from the illustrated embodiments thereof that numerous variations and modifications may be effected without departing from the true spirit and scope of the novel concepts or principles of this invention.

What is claimed is:

1. In a mobile machine having a member moveable between two orientations, such as a wheel frame member moveable between working and transport orientations in an agricultural machine, an actuator assembly for actuating an electric switch from a spring-biased first position to a second position upon movement of said member from one of said two orientations and for accommodating actuation of said switch to said first position upon movement of said member from the other of said two orientations, said assembly comprising:

a support means for supporting said switch in a fixed position relative to said moveable member orientations and for maintaining said switch in said fixed position;

a motion response element operably connected to said moveable member for being moved in one of two opposite directions in response to movement of said moveable member toward one of said orientations and for being moved in the other of said two directions in response to movement of said moveable member toward the other of said orientations; and switch actuating means comprising an actuating member defining an engaging surface for engaging said switch to actuate said switch to said second position, said actuating member being biased into frictional contact with said motion response element to create a static friction force therebetween which operably connects said actuating member with said motion response member, whereby said actuating member moves with said response element until any force of resistance to the continued movement of said actuating member exceeds the static friction force between said actuating member and said motion response element, thereby permitting continued movement of said motion response element relative to said actuating member while said actuating member maintains said switch in said second position.

2. The assembly in accordance with claim 1 in which said assembly includes stop means for limiting the movement of said actuating member.

3. In a machine having a member moveable between two orientations, an actuator assembly for actuating an electric switch from a first position to a second position upon movement of said member from one of said two orientations and for at least accommodating actuation of said switch back to the first position upon movement of said member from the other of said two orientations, said assembly comprising:

a support means for supporting said switch in a fixed position relative to said moveable member orientations and for maintaining said switch in said fixed position;

a motion response element operably connected to said moveable member for being moved in one of two directions in response to movement of said moveable member toward one of said orientations and for being moved in the other of said two directions in response to movement of said moveable member toward the other of said orientations; and switch actuating means comprising an actuating member defining an engaging surface for engaging said switch to actuate said switch to said second position, said actuating member being in frictional contact with said motion response element to provide a static friction force therebetween which operably connects said actuating member with said motion response element, whereby said actuating member is moved by said response element until any force of resistance to the continued movement of said actuating member exceeds the static friction force between said actuating member and said motion response element, thereby permitting continued movement of said motion response element relative to said actuating member while said actuating member maintains said switch in said second position.

4. The assembly in accordance with claim 3 further including biasing means for biasing said actuating member into frictional engagement with said motion response element.

5. The assembly in accordance with claim 3 further including spaced-apart stop means fixed relative to said switch support means for limiting the movement of said actuating member in the directions toward and away from said switch.

6. The assembly in accordance with claim 4 in which said motion response element includes a bar operably connected to said moveable member.

7. The assembly in accordance with claim 6 in which said assembly includes a lever pivotally mounted about an axis fixed relative to said switch support means, said lever having a free end pivotable about said axis in a plane parallel to the two directions of movement of said bar;

said actuating member includes a block defining a channel in which is received said bar;

said block includes a friction pad in surface-to-surface contact with said bar;

said biasing means includes a tension spring connected on one end to said block and on the other end to said lever free end; and said assembly includes stop means in the form of at least one abutment pin for being engaged by said lever.

8. The assembly in accordance with claim 3 in which said motion response element is a disc operably connected to said moveable member.

9. The assembly in accordance with claim 3 in which said moveable member includes a shaft journaled about an axis fixed relative to said switch support means for accommodating rotation of said shaft when said member is pivoted between said two orientations;

said motion response element includes a disc mounted to said shaft for rotation therewith in a plane;

said actuating member includes a bar pivotally mounted about a pivot axis fixed relative to said switch support means, said bar having a free end pivotable about said bar pivot axis in a plane parallel to the plane of rotation of said disc;

said bar includes a friction pad in surface-to-surface contact with said disc;

said bar is fabricated from a spring material and mounted about said bar pivot axis to function as a biasing means whereby said friction pad is biased and urged against said disc; and said assembly includes stop means in the form of at least one abutment pin for being engaged by said bar.

* * * * *